(12) United States Patent
Nagata et al.

(10) Patent No.: US 6,193,375 B1
(45) Date of Patent: Feb. 27, 2001

(54) DISPLAY DEVICE

(75) Inventors: Hideki Nagata, Sakai; Akira Sato, Shiga-ken, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/157,379

(22) Filed: Sep. 21, 1998

(30) Foreign Application Priority Data

Sep. 22, 1997 (JP) ..................................................... 9-256377

(51) Int. Cl.[7] ................................................. G03B 21/28
(52) U.S. Cl. ................................................. 353/30; 353/48
(58) Field of Search ................................. 353/30, 34, 37, 353/48, 49, 82, 50, 94; 359/449, 451, 630, 631, 204; 345/9, 7; 348/757, 780, 782, 783, 793, 800, 745, 747; 352/69, 70, 133, 134

(56) References Cited

U.S. PATENT DOCUMENTS

| | | | |
|---|---|---|---|
| 4,772,095 | * 9/1988 | Spencer . | |
| 5,023,725 | * 6/1991 | McCutchen | 352/70 |
| 5,085,495 | 2/1992 | Iwahara et al. | 353/94 |
| 5,153,621 | * 10/1992 | Vogeley | 353/37 |
| 5,181,122 | * 1/1993 | Ooishi | 353/37 |
| 5,539,483 | * 7/1996 | Nalwa | 353/30 |
| 5,640,171 | 6/1997 | Shimada | 345/8 |
| 5,913,591 | * 6/1999 | Melville | 353/28 |

* cited by examiner

*Primary Examiner*—William Dowling
(74) *Attorney, Agent, or Firm*—Burns, Doane, Swecker & Mathis, LLP

(57) ABSTRACT

A display device for projecting a plurality of aligned imaged produced by scanning, the projection being accomplished without producing borders between images. This display device monitors the shear between images, and the amount of the shear is fed back to the scanning units to eliminate the shear.

20 Claims, 10 Drawing Sheets

DISPLAY DEVICE

RELATED APPLICATIONS

This application is based on Application No. HEI 9-256377 filed in Japan, the content of which is hereby incorporated by reference.

BACKGROUND OF THE INVENTION

1. Field of the Invention

The present invention relates to a display device such as a head-mounted display (HMD) and display device for projectors of the laser scanning type.

2. Description of the Related Art

Heretofore, in liquid crystal display devices such as head-mounted displays, background projection type projectors and the like, so-called multiple panel type display devices have been realized which use a plurality of superposed liquid crystal panels to display wide area or high resolution images. Such display devices, for example, divide an original image vertically and horizontally among a plurality of liquid crystal panels, and by means of and optical system which receives the light of each area projects the image of each area on a screen with consideration given to the projection distance.

In this instance, resolution can be maintained while realizing a display of a wide area if the number of pixels of the screen used as a reference is used directly in plurality grouping. Furthermore, high resolution can be attained using the same screen size if the screen used as reference is divided and the number of pixels of each screen after division is set at the same number of pixels as the original reference screen. More simply, CRT displays may be arranged in multiple grouping to achieve wide area display. This arrangement is typically called "multivision."

Well understood disadvantages arise in the aforesaid multiple panel type liquid crystal display, however, inasmuch as the borders of each screen are visible and overlap so as to produce a so-called black matrix over the entire screen. As a result, conventional methods must invariably use discrete light sources for each screen, and since projection of the image is accomplished by optical units which receive the light of each area, attempting to eliminate the borders around each screen produces blurring which prevents accurate overlapping of adjacent areas.

Magnification and screen size vary due to slight differences of the optical path of each optical unit. Furthermore, gaps open between the various screens due to interference of adjacent elements of the optical units, and mechanical errors prevent overlapping. When using the aforesaid multivision type CRT display, a frame is clearly apparent on the periphery of each Braun tube from the original. Extremely complex mechanical elements are required to achieve tight overlapping of the areas, with the result that errors cannot be eliminated.

SUMMARY OF THE INVENTION

An object of the present invention is to eliminate the previously described disadvantages.

Another object of the present invention is to provide an improved display device which provides a single image by combining a plurality of display images.

Still another object of the present invention is to provide a display device capable of displaying wide area and high resolution images without uncomfortable borders between images.

Yet another object of the present invention is to provide a display device capable of displaying a single large image with a clear border on the image periphery using a plurality of scanning optical units.

These and other objects are attained by providing a display device comprising; a plurality of light sources, a plurality of scanner for scanning light emitted from the light sources, and a screen to project from behind an array of a plurality of scanned images.

The aforesaid objects are further attained by providing a display device comprising; a plurality of light sources, a plurality of scanner for scanning light emitted from the light sources, a screen for projecting from behind an array of a plurality of scanned images, a sensor for monitoring the border areas between images, and a controller for controlling a position of the image on the screen based on an output of the sensor.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
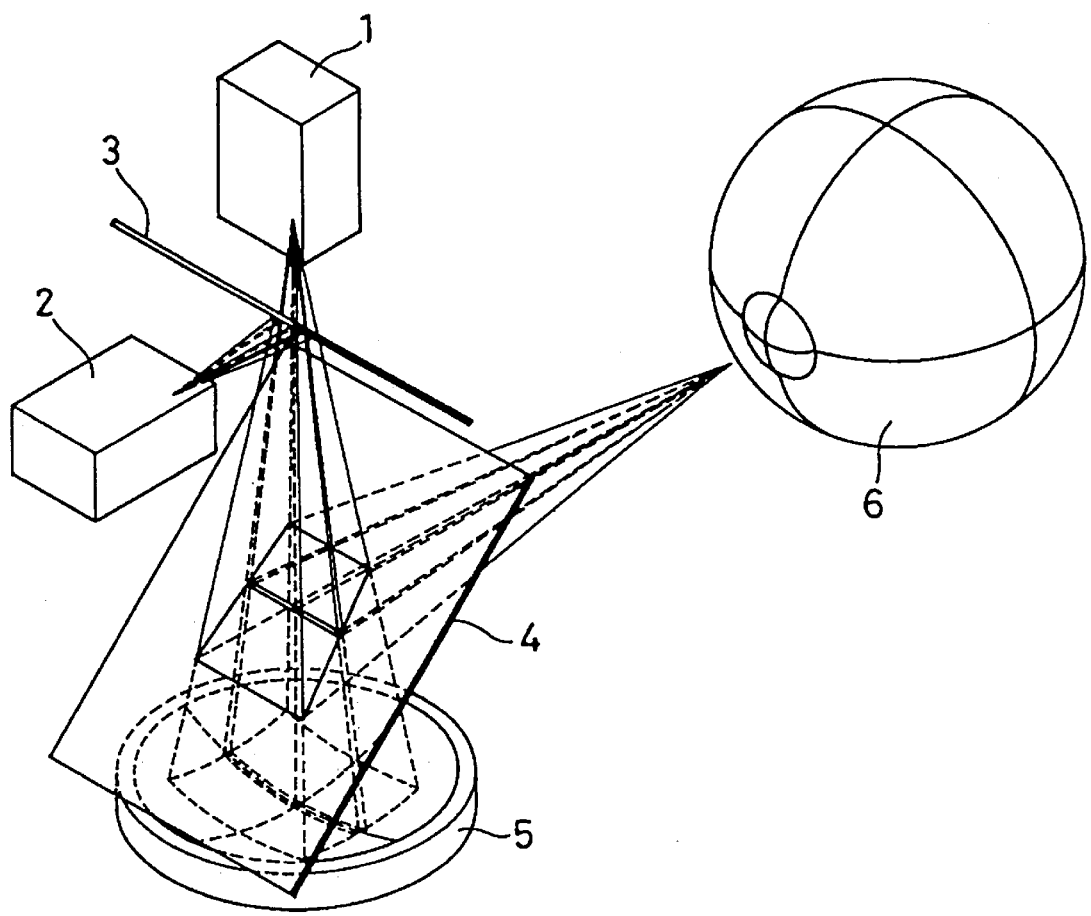
FIG. 1 is a perspective view showing the construction of a display device.

The preferred embodiments of the present invention are described hereinafter with reference to the accompanying drawings. FIG. 1 is a perspective view showing the basic construction of the display device. FIG. 1 pertains to a head-mounted display which uses laser scanning to display images on the retina of an observer; the case in point shows two screens aligned for display. In the drawing, reference number 1 refers to a first scanning unit for emitting a laser beam to scan in two-dimensional direction, reference number 2 refers to an identical second scanning unit, reference number 3 refers to a first half mirror, reference number 4 refers to a second half mirror, reference number 5 refers to an eyepiece optical unit (a concave mirror in this instance), and reference number 6 refers to the eye of an observer.

First half mirror 3 is inclined relative to the optical path, and first scanning unit 1 is disposed thereabove with second scanning unit disposed to the side. Below first half mirror 3, a second half mirror 4 is inclined so as to face opposite to the mirror 3, and below second half mirror 4 is eyepiece optical unit 5 having a concave surface (reflective surface) which faces upward.

The scanning light emitted from first scanning unit 1 is transmitted through first half mirror 3 and then second half mirror 4 and arrives at eyepiece optical unit 5 so as to be reflected as a virtual image in the distance, then is reflected by second half mirror 4 and directed toward the eye 6 of the observer. The scanning light emitted from second scanning unit 2 is reflected by first half mirror 3, then is transmitted through second half mirror 4 and arrives at the eyepiece optical unit 5 and is reflected as a virtual image in the distance, then is reflected by second half mirror 4 and directed to the eye 6 of the observer.

Wide area or high resolution is achieved by aligning adjacent images at overlapping positions so as to form a single screen. Since each image is formed by laser scan, the edge of the images are not blurred and boundaries are sharp. Therefore, if the overlaps are accurate, the screen is unified and bordering or edging of individual images does not occur. This achievement is fully described later.

Figure 2:
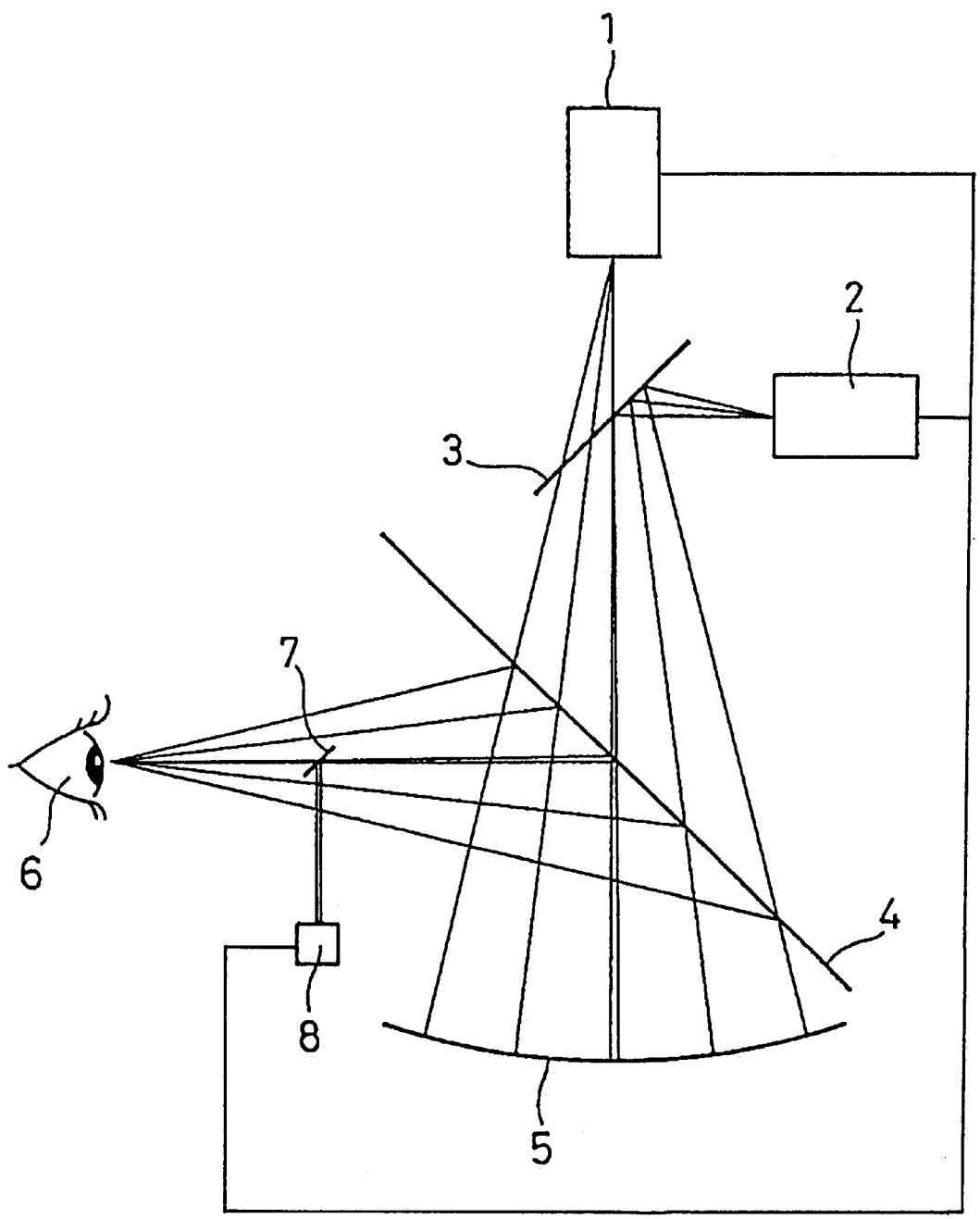
FIG. 2 is a side section view of the display device of FIG. 1.

FIG. 2 shows the basic construction of the display device of FIG. 1 as viewed from the side. As shown in FIG. 2, first half mirror 3 and second half mirror 4 are arranged so as to be nearly perpendicular to one another. Scanning light emitted from first scanning unit 1 and second scanning unit 2 projects an image at an optimum state of superimposition on second half mirror 4, and is directed toward eye 6. The operation of half mirror 7 and area sensor 8 in the drawing are described later.

Figure 3:
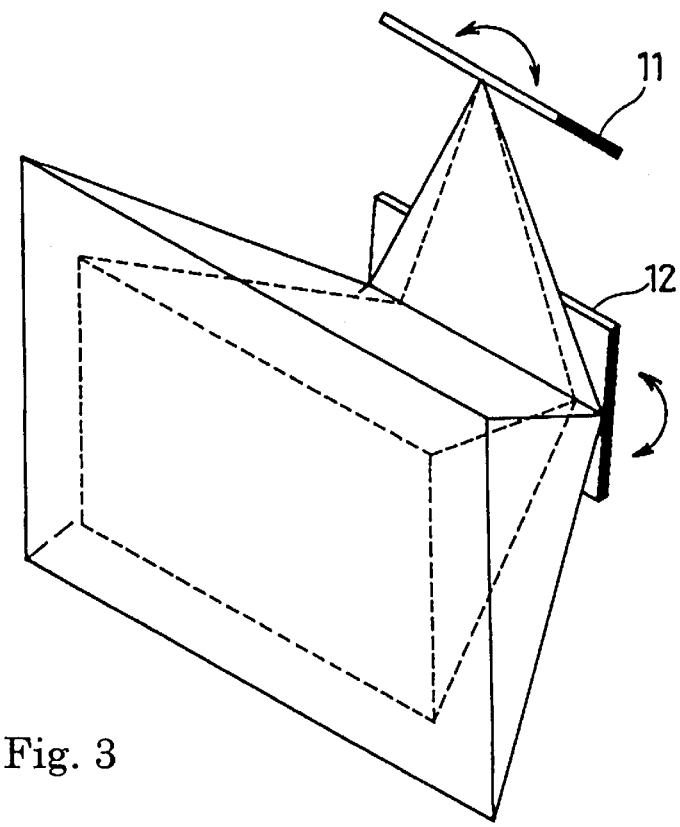
FIG. 3 is a perspective view of the scanning unit.

FIG. 3 is a perspective view showing the basic construction of the aforesaid scanning units. In FIG. 3, reference number 11 refers to a first scanning mirror, and reference number 12 refers to a second scanning mirror, which function as a single deflection device by rotating in synchronization with the scanning cycle. Image points of the light from a laser light source not shown in the illustration form a line image via first scanning mirror 11, then the line image forms a screen image via second scanning mirror 12. This process forms an image. Although the scanning region is the range indicated by the solid line in FIG. 3, the area actually used as a screen is the range indicated by the dashed line in FIG. 3.

Figure 4:
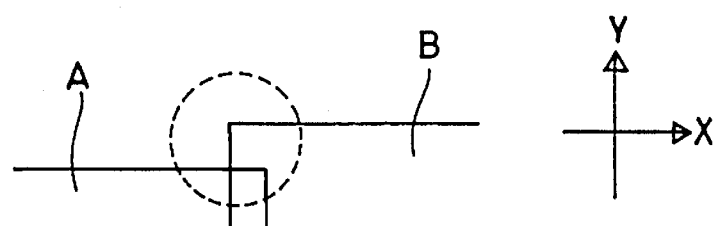
FIGS. 4(a) and 4(b) illustrate the principle of overlapping screens.
Figure 4:
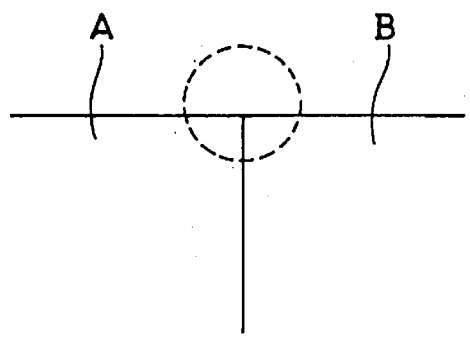

At this time, the range used for the screen is electrically controlled and mutually adjusted to accurately overlap adjacent screens. FIGS. 4(a) and 4(b) illustrate this principle. FIG. 4(a) shows an area within the dashed line including the corners of left and right screens A and B. As a result, when the screens are mutually shifted in both the X direction and Y direction, the range used as the screen is electrically shifted slightly vertically while observing the degree of flatness of the top edge of the screen in order to first align the Y direction (vertical direction). Then, the range used as the screen is electrically shifted slightly in the lateral direction while observing the luminance distribution of the screen to align the X direction (horizontal direction).

Finally, if the corners are mutually aligned as shown in FIG. 4(b), the top edge of the screen is level, and the screen luminance is uniform and the overlap is determined to be accurate. In this instance, the signal to start the scan of the screen can determine the required scan timing by storing the image signals in the frame memory and simply shifting the timing of the scan start signal. This is the strong point of using a laser scanning system since the overlap areas are arranged more accurately than in conventional methods.

Observation of the screen overlap is accomplished by area sensor 8, shown in FIG. 2. Area sensor 8 comprises a charge-coupled device (CCD) or the like. As shown in FIG. 2, an image on the periphery of each screen is extracted by half mirror 7 which has low reflectivity, and this image is directed to area sensor 8 which allows feedback of the observation result. Alternatively, half mirror 7 may be large in scale to extract the image of the entire screen, the entirety of which is monitored by area sensor 8.

In both the aforesaid instances overlap adjustment can be accomplished even after the components are shipped from the factory. Although such adjustment is basically accomplished at the time of shipping, there is concern that the screen may shift due to post-shipment mechanical error caused by, for example, minute change in the number of oscillations of the scanning mirror caused by temperature fluctuation. Accordingly, ideally any condition can be managed by having a feedback function in the device itself.

Figure 5:
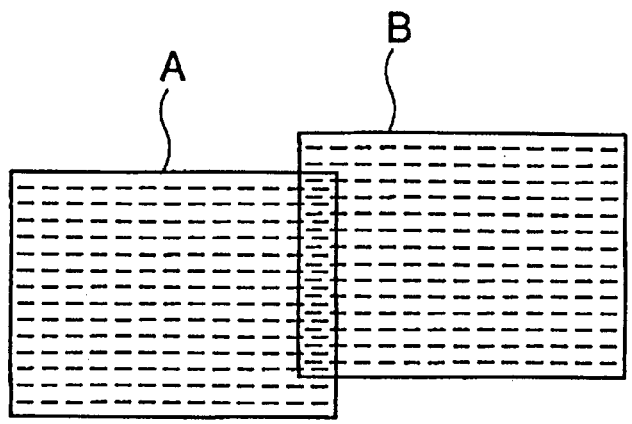
FIGS. 5(a), 5(b), 5(c), 5(d), and 5(e) illustrate the sequence of overlapping screens.
Figure 5:
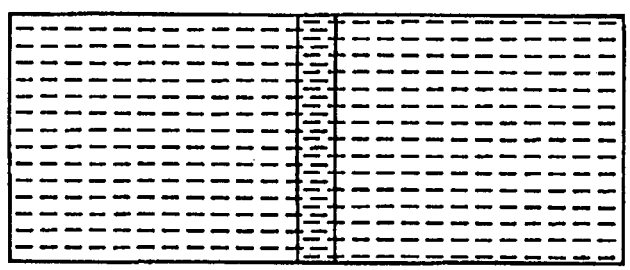
Figure 5:
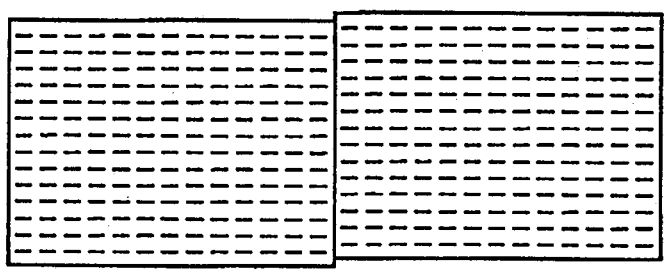
Figure 5:
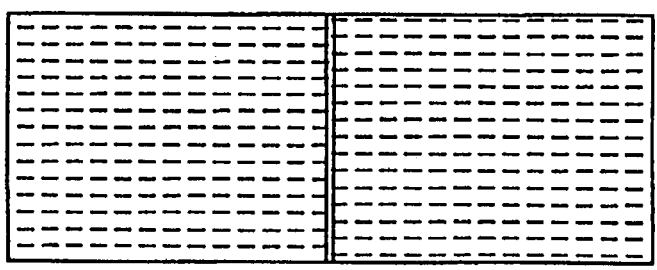
Figure 5:
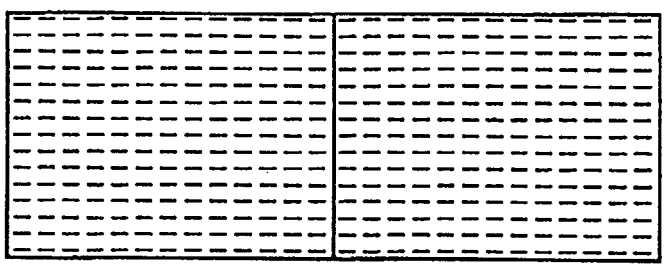

FIGS. 5(a), 5(b), 5(c), 5(d), and 5(e) illustrate an example of the sequence for adjusting the overlap of screens in the horizontal direction. It is desirable that a monochrome image of uniform luminance is used as the adjustment image. As shown in FIG. 5(a), when screens A and B are mutually shifted in both vertical and horizontal directions, the range used as a screen is first electrically shifted slightly in vertical direction based on degree of levelness to align the vertical direction. In this way the shear in the vertical direction is eliminated as shown in FIG. 5(b). Shear still remains in the horizontal direction, however, and the ranges of both screens mutually intrude one upon another.

Then, the range used as a screen is slightly shifted laterally based on luminance to align the screens in the horizontal direction. In this way shear is eliminated in the horizontal direction as shown in FIG. 5(c), but the effects of the adjustment again produce a slight shear in the vertical direction. Then, the screens are again aligned in the vertical direction. Although shearing in the vertical direction is eliminated as shown in FIG. 5(d), the effects of the adjustment again produce slight shearing in the horizontal direction. Therefore, the screens are again aligned in the horizontal direction. This sequence is repeated until ultimately accurate overlap is accomplished as shown in FIG. 5(e). When arrayed vertically, the determination of levelness and luminance which are used as standards for the shear determination may be switched.

FIGS. 6(a) and 6(b) show the construction of an optical system of a head-mounted device using a laser optical system. In FIG. 6(a), light emitted from laser light source 13 is transmitted through collimator lens 14 forming parallel rays, and is divided by half mirror 17 into two fluxes. Within these fluxes, light reflected by half mirror 17 is reflected by half mirror 18, passes through first scanning mirror 11, and is reflected by second scanning mirror 12. Thereafter, the light is again reflected by first scanning mirror 11, then is reflected by second scanning mirror 12, again passes through first scanning mirror 11, passes through half mirror 18, and is reflected by first half mirror 3. Then, the light is reflected by second half mirror 4 and reaches eyepiece optical unit 5 which reflects the light as a virtual image in the distance, the light passes through second half mirror 4 and is directed to the eye 6 of the observer.

Light emitted from laser light source 13 which has passed through collimator lens 14 and formed parallel rays and been transmitted through half mirror 17 is similarly reflected by half mirror 19, passes through first scanning mirror 11', and is reflected by second scanning mirror 12', then is reflected by first scanning mirror 11', and again reflected by second scanning mirror 12'. Thereafter, the light again passes through first scanning mirror 11', passes through half mirror 19, and passes through first half mirror 3, then is reflected by second half mirror 4, and reaches the eyepiece optical unit 5 which reflects the light as a virtual image in the distance, and the light passes through second half mirror 4 and is directed to the eye 6 of the observer.

In this instance, since there is only a single light source, shutters 15 and 16 are interposed between half mirrors 17 and 8 and half mirrors 17 and 19, respectively, so as to control the screen projected by operating these shutters in time division, and by switching these shutters to achieve an effect similar to using two light sources to produce independent images. In the aforesaid construction, a wide area or high resolution is achieved as shown in FIG. 1 by positioning the respective screens to overlap in adjacent alignment as a single screen.

Figure 6:
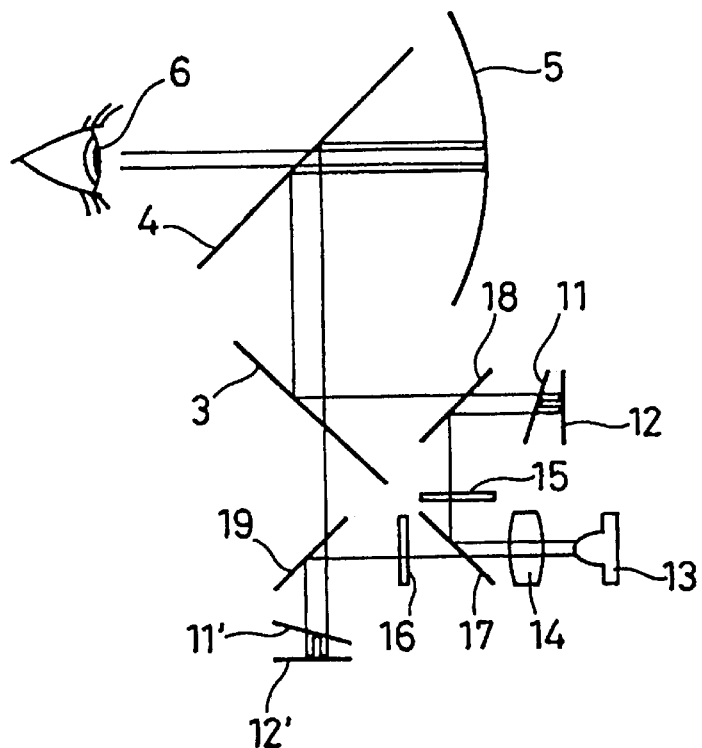
FIGS. 6(a) and 6(b) shows the construction of the optical system of a head-mounted display.
Figure 6:
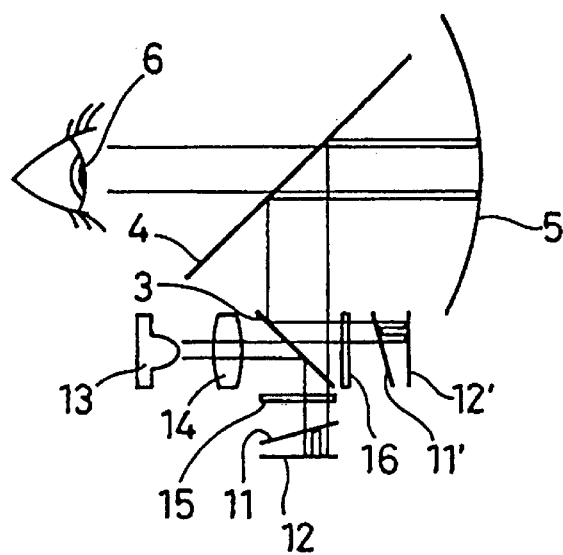

FIG. 6(*b*) simplifies the construction of the optical system to achieve a more compact form factor. In FIG. 6(*b*), light emitted from laser light source 13 passes through collimator lens 14 to form parallel rays which are divided into two fluxes by first half mirror 3. Within this flux, light reflected by first half mirror 3 passes through first scanning mirror 11, is reflected by second scanning mirror 12, then is reflected by first scanning mirror 11, and again reflected by second scanning mirror 12. Thereafter, the light is again transmitted through first scanning mirror 11, and passes through first half mirror 3, then is reflected by second half mirror 4, and reaches the eyepiece optical unit 5 and is reflected as a virtual image in the distance, passes through second half mirror 4, and is directed to the eye 6 of the observer.

Light emitted from laser light source 13 which has passed through collimator lens 14 to form parallel rays and passed through first half mirror 3 similarly passes through first scanning mirror 11', and is reflected by second scanning mirror 12', then is reflected by first scanning mirror 11' and again reflected by second scanning mirror 12'. Thereafter, the light again passes through first scanning mirror 11', and is reflected by first half mirror 3, then is reflected by second half mirror 4 and reaches the eyepiece optical unit 5 which reflects the light as a virtual image in the distance, and passes through second half mirror 4 and is directed to the eye 6 of the observer.

In the same way as in FIG. 6(*a*), shutters 15 and 16 are interposed between first half mirror 3 and first scanning mirror 11, and first half mirror 3 and first scanning mirror 11', respectively, so as to control the screen projected by operating these shutters in time division, and by switching these shutters to achieve an effect similar to using two light sources to produce independent images. Similarly, in the aforesaid construction, a wide area or high resolution is achieved as shown in FIG. 1 by positioning the respective screens to overlap in adjacent alignment as a single screen.

Figure 7:
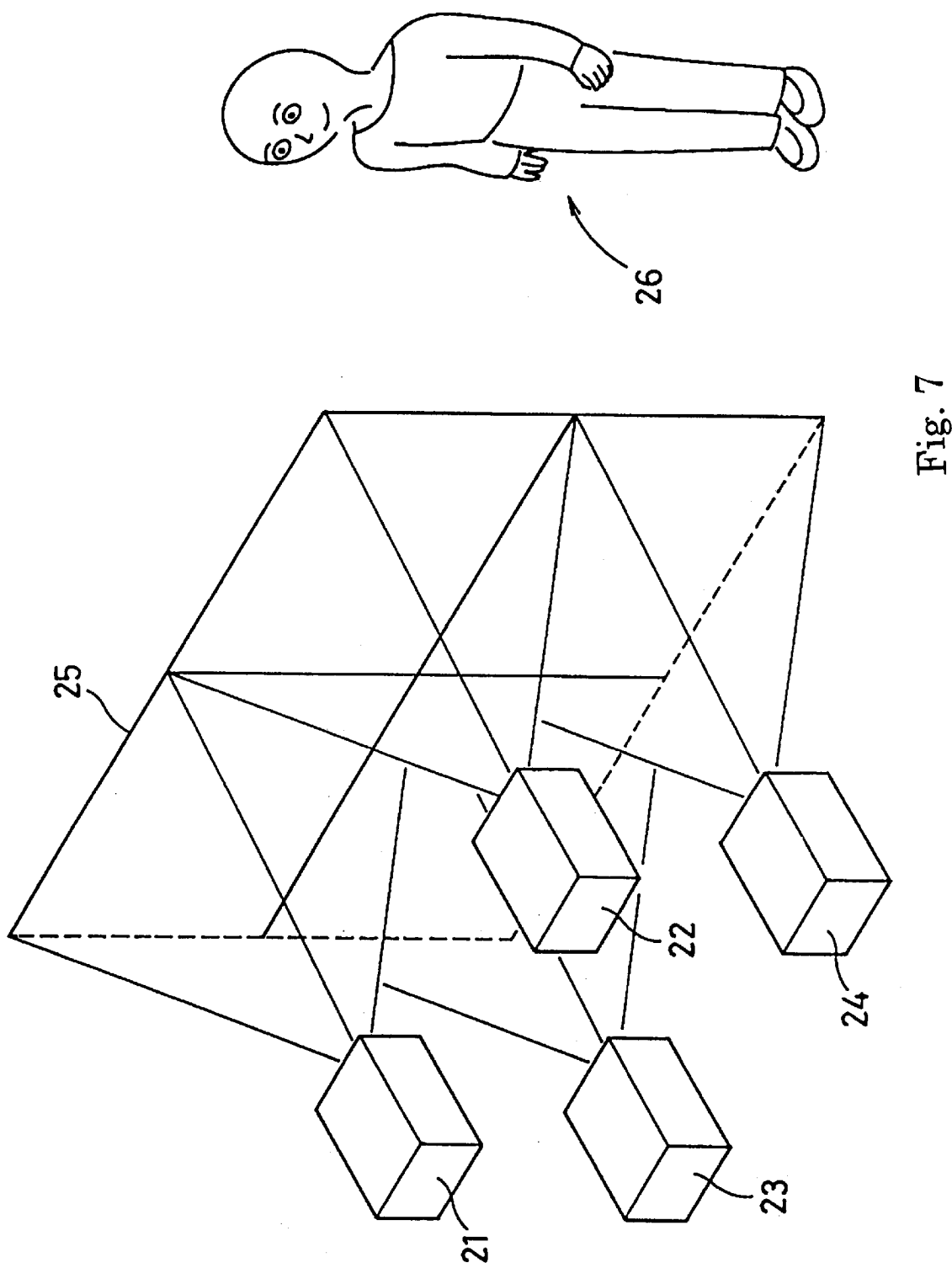
FIG. 7 shows the construction of a background projection type projector.

FIG. 7 shows the construction of a background projection type projector using a laser optical system. In FIG. 7, reference number 21 refers to a first scanning unit, reference number 22 refers to a second scanning unit, reference number 23 refers to a third scanning unit, and reference number 24 refers to a fourth scanning unit, reference number 25 refers to a screen, and reference number 26 refers to an observer. As shown in the drawing, the respective screens are projected onto the screen by the separate scanning units, and the images if the images are electrically adjusted as previously described so as to accurately overlap the mutual edges of the images, a wide area image is realized without bordering from the perspective of the observer 26.

Figure 8:
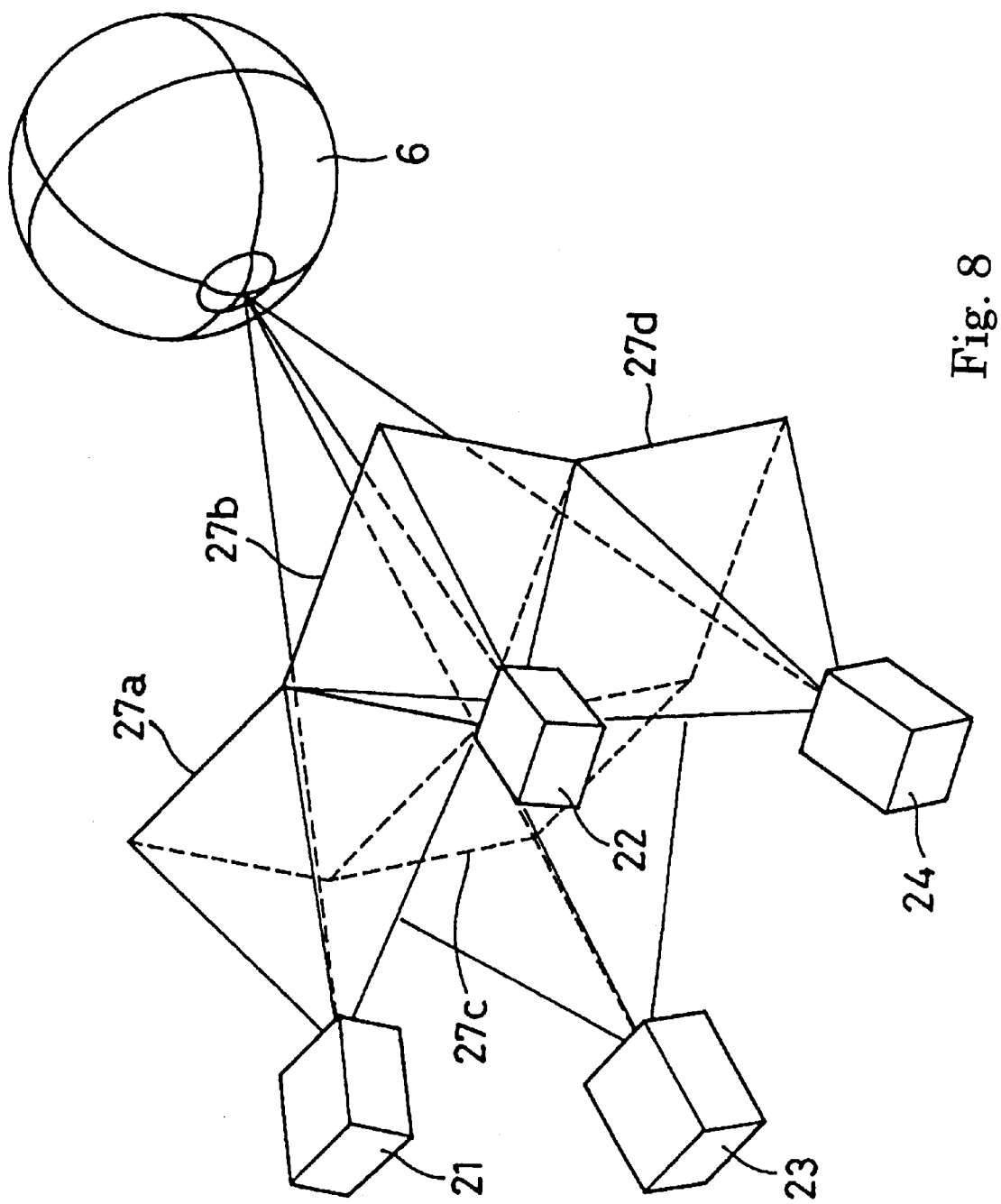
FIG. 8 shows another construction of a background projection type projector.

FIG. 8 shows the construction of another background projection type projector using a laser optical system. In this instance, the screen and observer are relatively close, e.g., a virtual reality space in an amusement arcade. The screens of the first scanning unit 21, second scanning unit 22, third scanning unit 23, and fourth scanning unit 24 are projected on screens 27*a*, 27*b*, 27*c*, and 27*d*, respectively, and each screen is constructed so as to be at equal distance from the eye 6 of the observer to elicit a sense of presence. At this time, each screen is a parallelogram to accurately overlap adjacent screens.

Figure 9:
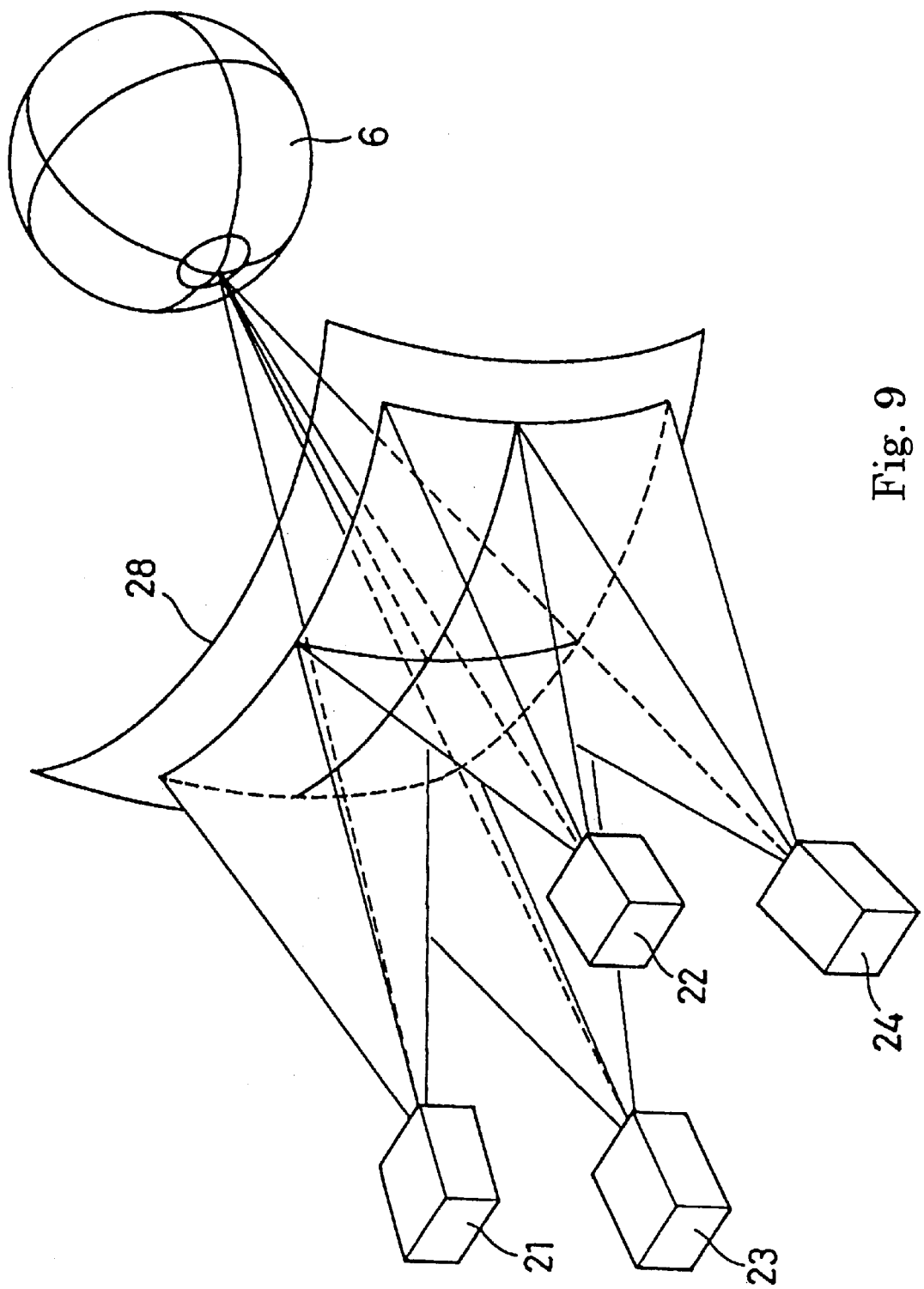
FIG. 9 shows the construction of a head-mounted display.

FIG. 9 shows the construction of a head-mounted display using a laser optical system. In this instance, images are actually displayed on the retina of the eye 6 of the observer by scanning light from first scanning unit 21, second scanning unit 22, third scanning unit 23, and fourth scanning unit 24. In this mode, the screen of each scanning unit is projected on and theoretically spherical screen 28 to form an intermediate image which is viewed by the eye 6. If each screen is electrically adjusted as previously described to accurately overlap edges on the spherical screen, a wide area view or high resolution image without bordering can be realized from the perspective of eye 6.

Figure 10:
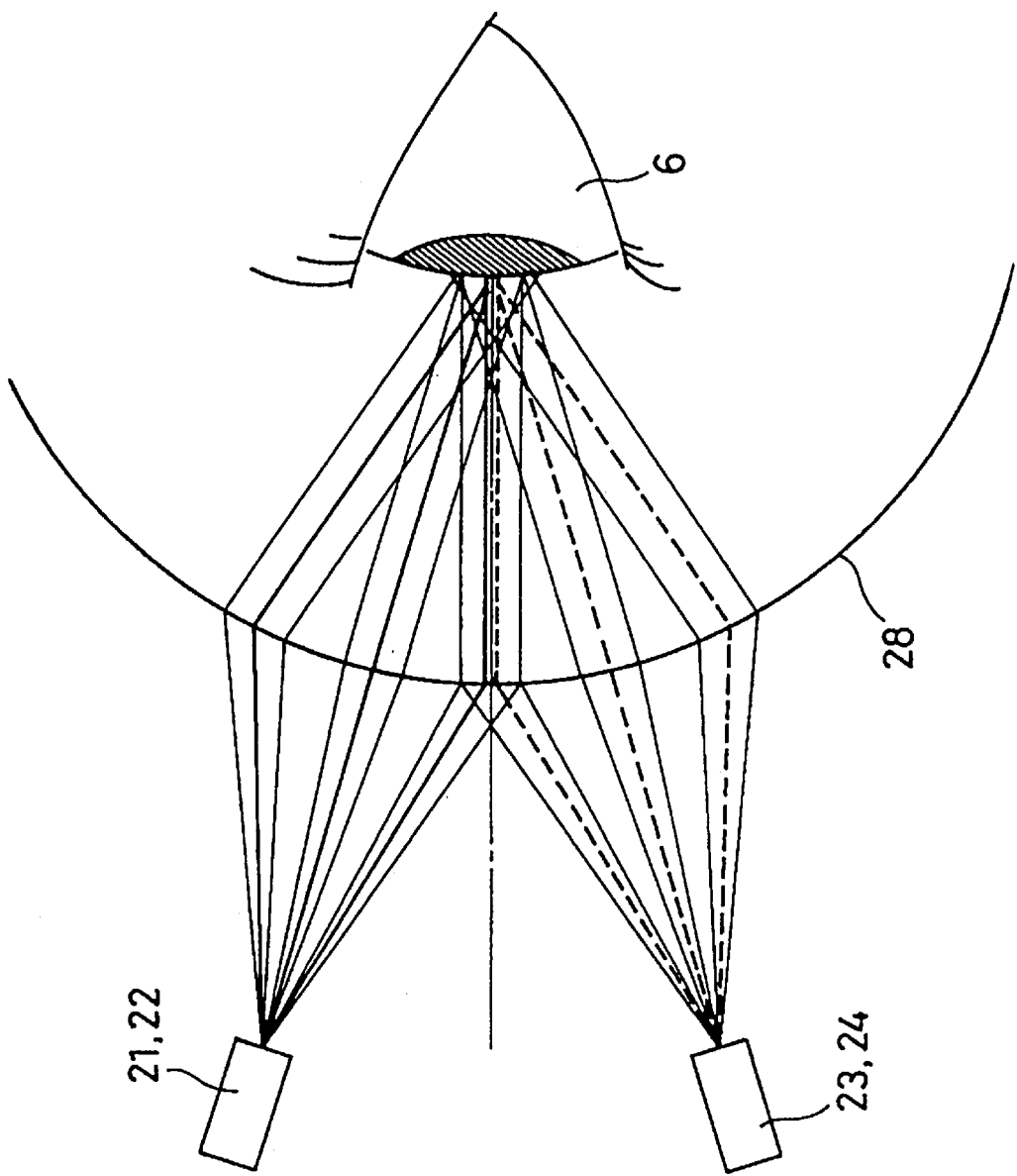
FIG. 10 is a side view of the head-mounted display of FIG. 9.

FIG. 10 shows the aforesaid construction viewed from the side. As shown in the drawing, scanning light from first and second scanning units 21 and 22 positioned above eye 6 projects an image on theoretically spherical screen 28 in the range indicated by the thick solid lines, and is viewed by eye 6. The scanning light from third and fourth scanning units 23 and 24 position below eye 6 is projected on theoretically spherical screen 28 in the range indicated by the thick dashed lines, and is viewed by eye 6. The adjustment range of the aforesaid scanning light is the scanning area.

The scanning light scanning the bottom edge of the top side image and the scanning light scanning the top edge of the bottom side image are adjacent pixels which enter eye 6 while maintaining their mutual distances that accurate overlap is achieved on the retina. This adjustment is theoretically possible. In the constructions used in the previously described embodiments examples are provided of four individually arrayed scanning units. The present invention is not limited to this arrangement, however. Needless to say wider area images and higher resolution can be realized if more scanning units are used.

Figure 11:
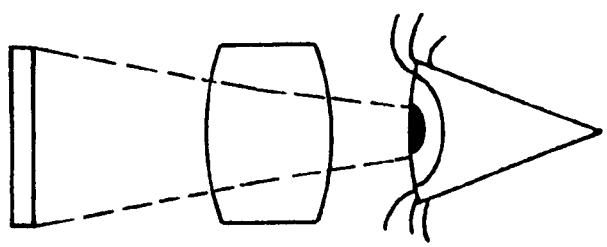
FIGS. 11(a), 11(b), and 11(c) show the states of viewing a normal image, wide field-of-view image, and high resolution image, respectively.
Figure 11:
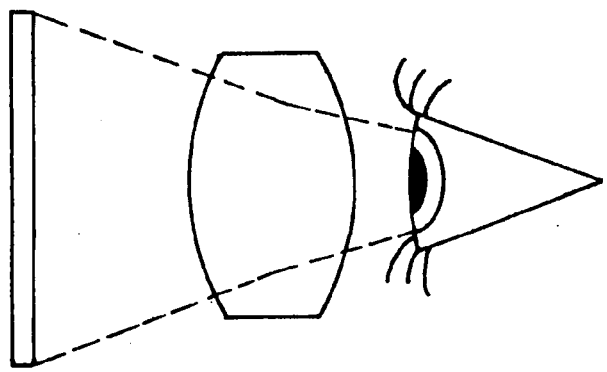
Figure 11:
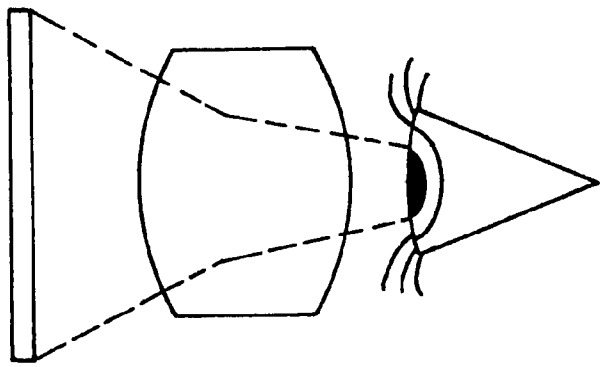

A construction for observing high resolution images is described below with reference to FIGS. 11(*a*), 11(*b*), and 11(*c*). That is, FIGS. 11(*a*), 11(*b*), and 11(*c*) respectively illustrate conditions when viewing a normal image, wide field of view image, and high resolution image. FIG. 11(*a*) shows the typical condition of viewing a single image. FIG. 11(*b*) shows the condition of viewing a plurality of aligned images at the same magnification as the normal image of FIG. 11(*a*). That is, magnification and resolution are identical to that of the normal image, and only the field of view is wider.

FIG. 11(*c*) shows a high resolution image viewed by projecting a reduction of a plurality of aligned image on the eye. That is, in FIG. 11(*c*), the field of view area is the same as for a normal image, but there is more viewed information. In other words, a high resolution image is viewed.

According to the previously described embodiments, a plurality of adjacent images formed by a plurality of deflectors form a sharp image area without frames, so as to produce an easy-to-view composite image without the sense of discomfort which arises from frames in the border areas.

A display device is provided which is capable of displaying wide area image and high resolution images without bordering of screens of the various areas when screens are aligned in a plurality of areas.

Since the projection position is controlled via feedback of the projection position relationship detected by detection means, the projection position can be simply adjusted not only when the device is shipped but also by maintenance personnel, and normally the projection position can be automatically controlled when in use.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A display device, comprising:
    a plurality of light sources;
    a plurality of scanners for scanning light emitted from the light sources and for forming a plurality of images;
    a screen onto which is projected an array of the plurality of scanned images; and
    a controller for adjusting the scanning ranges of said scanners relative to one another to align the plurality of scanned images projected onto said screen.

2. A display device of claim 1, wherein the array of images are projected onto the screen from behind, relative to a viewer.

3. A display device of claim 1, wherein the screen has a plurality of portions, each of which displays one of the scanned images.

4. A display device of claim 3, wherein the each portion is flat.

5. A display device of claim 4, wherein each portion is inclined with respect to another portion.

6. A display device of claim 1, wherein the screen is spherical.

7. A display device, comprising:
    a light source which emits a light;
    a dividing device which divides the emitted light into a plurality of lights;
    a plurality of scanners for scanning the plurality of divided lights and for forming a plurality of images;
    a screen onto which is projected an array of the plurality of scanned images; and
    a controller for adjusting the scanning ranges of said scanners relative to one another to align the plurality of scanned images projected onto said screen.

8. A display device of claim 7, wherein the array of images are projected onto the screen from behind, relative to a viewer.

9. A display device of claim 7, wherein the screen has a plurality of portions, each of which displays one of the scanned images.

10. A display device of claim 9, wherein the each portion is flat.

11. A display device of claim 10, wherein each portion is inclined with respect to another portion.

12. A display device of claim 7, wherein the screen is spherical.

13. A display device of claim 7, wherein the images projected on the screen are intermediate images.

14. A display device of claim 7, further comprising:
    a sensor for monitoring a border area between images; and wherein said controller controls a position of the image on the screen based on an output of the sensor.

15. A display device, comprising:
    a plurality of light sources;
    a plurality of scanners for scanning light emitted from the light sources and for forming a plurality of images;
    a screen onto which is projected an array of the plurality of scanned images;
    a sensor for monitoring a border area between images; and
    a controller for controlling a position of the image on the screen based on an output of the sensor.

16. A display device of claim 15, wherein the array of images are projected onto the screen from behind, relative to a viewer.

17. A display device of claim 15, wherein the screen has a plurality of portions, each of which displays one of the scanned images.

18. A display device of claim 17, wherein the each portion is flat.

19. A display device of claim 18, wherein each portion is inclined with respect to another portion.

20. A display device of claim 15, wherein the screen is spherical.

* * * * *